Patented Nov. 20, 1951

2,575,692

UNITED STATES PATENT OFFICE 2,575,692

N-METHYL OXAZOLIDINE-2,4-DIONES

Marvin A. Spielman, Waukegan, Ill., assignor to Abbott Laboratories, North Chicago, Ill., a corporation of Illinois No Drawing. Application October 11, 1947, Serial No. 779,424

6 Claims. (Cl. 260—307)

The present invention relates to 3-methyloxazolidine-2,4-diones and more particularly to 5-lower alkyl or 5,5-di-lower alkyl 3-methyloxazolidine-2,4-diones in which the alkyl group or groups at the 5-position are characterized by the presence of one to three carbon atoms inclusive.

The products of the present invention may be represented by the following formula:

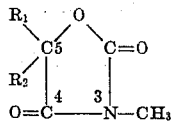

where $R_1$ represents a member selected from the group consisting of hydrogen, methyl, ethyl and propyl and $R_2$ represents a member selected from the group consisting of methyl, ethyl and propyl. These compounds, as shown by the above formula, have a methyl group on the nitrogen (N) atom at the 3-position and at least one lower alkyl group having 1 to 3 carbon atoms at the 5-position.

The present invention is based on a research investigation resulting in the discovery that the presence of a methyl group at the 3-position produced radical changes in the therapeutic properties of certain 5-lower alkyl and 5,5-di-lower alkyl oxazolidine-2,4-diones. With continued investigation it was discovered that the N-methyl compounds having a lower alkyl group or groups containing 1 to 3 carbon atoms at the 5-position, possessed valuable therapeutic properties.

The basic ring or intermediate of the compounds of the present invention is known in the art as oxazolidine-2,4-dione. This compound as well as the 5-alkyl and 5,5-dialkyl derivatives thereof may be made by various processes. For example, the 5,5-dialkyl derivatives may be prepared by reacting a ketone with cyanides and thiocyanates followed by desulfurization. The oxazolidine-2,4-diones may also be prepared by condensing an α-hydroxyamide with ethyl chlorocarbonate or by condensing an α-hydroxy ester with urea. Another method described by Traube and Ascher (Ber., 46, 2077, 1913) consists in the condensation of an α-hydroxy ester with guanidine, followed by hydrolysis.

The N-methyl oxazolidine-2,4-dione products of the present invention may also be prepared by various processes. For example, alkylation at the 3-position may be accomplished by treatment of the oxazolidine-2,4-dione intermediate with dimethyl sulfate or by treatment of the silver salt with methyl halide. The following examples will serve for illustrative purposes.

EXAMPLE I

*3,5,5-trimethyloxazolidine-2,4-dione*

About 30 grams of sodium hydroxide are added to about 72 grams of 5,5-dimethyloxazolidine-2,4-dione dissolved in 400 cc. of water. To this solution, with external cooling and violent stirring, are added (dropwise) about 85 grams of dimethyl sulfate, the rate of addition being such that the temperature of the reaction solution does not rise above 50° C. The reaction mixture is then extracted with ether, the ether removed in the usual manner and the extract distilled at about 82°–85° C. at 5 mm. The purified product crystallized from ethyl ether or from water forms stout prisms with a melting point of about 45°–46° C.

EXAMPLE II

*3,5-dimethyloxazolidine-2,4-dione*

This product may be prepared in accordance with the process of Example I by reacting about 22 grams of 5-methyloxazolidine-2,4-dione with about 26.5 grams of dimethyl sulfate in an aqueous reaction mixture containing about 9.2 grams of sodium hydroxide. The desired product, isolated by ether extraction, is a colorless oil with a boiling point of about 75°–83° C. at 4 mm. and 138° C. at 50 mm.

EXAMPLE III

*3,5-dimethyl-5-ethyloxazolidine-2,4-dione*

This product is also prepared in accordance with the process of Examples I and II by reacting 5-methyl-5-ethyl-oxazolidine-2,4-dione with dimethyl sulfate. The desired product is obtained as a colorless liquid, boiling point 101–102° C. at 11 mm., $n_D^{25}$ 1.4507.

Additional compounds of the present invention which may be prepared in accordance with the above examples are:

EXAMPLE IV

*3-methyl-5-ethyloxazolidine-2,4-dione*

This product is obtained as a colorless liquid, boiling point 160–165° C. at 100 mm., $n_D^{25}$ 1.4567.

EXAMPLE V

*3-methyl-5,5-diethyloxazolidine-2,4-dione*

This product is obtained as a colorless liquid, boiling point 105–109° C. at 11 mm., $n_D^{25}$ 1.4500.

EXAMPLE VI

*3-methyl-5-n-propyloxazolidine-2,4-dione*

This product is obtained as a colorless liquid, boiling point 99–101° C. at 3 mm., $n_D^{25}$ 1.4567.

EXAMPLE VII

*3,5-dimethyl-5-n-propyloxazolidine-2,4-dione*

This product is obtained as a colorless liquid, boiling point 135–138° C. at 35 mm., $n_D^{25}$ 1.4498.

EXAMPLE VIII

*3-methyl-5,5-di-n-propyloxazolidine-2,4-dione*

This product is obtained as an oil, boiling point 100–105° C. at 4 mm. On standing it crystallizes, melting point 46–47° C.

EXAMPLE IX

*3-methyl-5-isopropyloxazolidine-2,4-dione*

This product is obtained as a colorless liquid, boiling point 118–119° C. at 18 mm., $n_D$ 1.4554.

Other compounds of the present invention which may be prepared by methylating the appropriate 5-alkyl substituted oxazolidine-2,4-dione are the 3-methyl-5-ethyl-5-n-propyl derivative as well as other isopropyl compounds such as the 3,5-dimethyl-5-isopropyloxazolidine-2,4-dione. In addition to the illustrative process employed above, the compounds of the present invention may also be prepared by reacting the 5-alkyl substituted oxazolidine-2,4-diones with silver nitrate in the presence of sodium hydroxide, and then reacting the resulting silver salt with methyl iodide.

The compounds of the present invention are characterized for the most part by analgesic properties coupled with substantially no or relatively low hypnotic activity. The methyl derivatives in particular, e. g. the 3,5,5-trimethyl derivative (Example I), the 3,5-dimethyl-5 ethyl derivative (Example III), etc., also have a pronounced anti-convulsant type of action. As hypnotic activity (a generally undesirable property in analgesic and anticonvulsant agents) tends to increase as the carbon group at the 5-position increases, at least one methyl group in the 5-position is ordinarily preferred and this is particularly true when a strong anti-convulsant type of action, in addition to analgesic activity, is desired.

This application is a continuation in part of my co-pending application, Serial No. 630,994, filed November 26, 1945, now abandoned, which in turn is a continuation in part of my co-pending application Serial No. 403,073, filed July 18, 1941, now abandoned. The product of Example I (3,5,5-trimethyloxazolidine-2,4-dione) and the product of Example III (3,5-dimethyl-5-ethyloxazolidine-2,4-dione) are claimed respectively in my copending applications Serial No. 79,295 and Serial No. 79,294, both of which were filed on March 2, 1949.

Without further elaboration the foregoing will so fully explain my invention that others may readily adapt the same for use under various conditions of service.

I claim:

1. A 3-methyloxazolidine-2,4-dione represented by the following formula

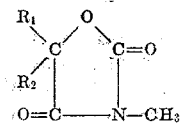

where $R_1$ represents a member selected from the group consisting of hydrogen and lower alkyl groups containing one to three carbon atoms inclusive, and $R_2$ represents a lower alkyl group containing one to three carbon atoms inclusive.

2. The product, 3,5-dimethyloxazolidine-2,4-dione.

3. The product, 3-methyl-5-ethyloxazolidine-2,4-dione.

4. The product, 3-methyl-5,5-diethyloxazolidine-2,4-dione.

5. The product, 3,5-dimethyl-5-n-propyloxazolidine-2,4-dione.

6. The product, 3-methyl-5,5-di-n-propyloxazolidine-2,4-dione.

MARVIN A. SPIELMAN.

REFERENCES CITED

The following references are of record in the file of this patent:

Chemical Abstracts, vol. 14, pp. 46 to 48 (1920).

Beilstein, 4th edition, vol. 27, pp. 251 to 253 (1937).